UNITED STATES PATENT OFFICE 2,035,418

PROCESS FOR STABILIZING WHITE OILS

Francis M. Archibald, Roselle, N. J., assignor to Standard Oil Development Company, a corporation of Delaware No Drawing. Application February 19, 1931, Serial No. 517,118

3 Claims. (Cl. 196—1)

The present invention relates to a method of stabilizing white mineral oils against deterioration which manifests itself first in a rancid taste and, when proceeding further, then in a poorer color. The invention will be fully understood from the following description.

The white mineral oils are highly refined oils usually prepared from light lubricating oils by sulfuric acid treatment followed by several treatments with fuming sulfuric acid. The sludge is settled out and the acid treated oil is given a soda wash for the purpose of neutralization. Washing with a 25 to 55% solution of aqueous ethyl or isopropyl alcohol may follow in order to remove further undesirable constituents. The dissolved alcohol is then separated from the oil by steam distillation. The oil thus obtained is the so-called neutral oil which has a fairly poor color and is somewhat cloudy. The neutral oil is subjected to filtration through a bed of fuller's earth until its color is +30 Saybolt or above. Highly purified white mineral oils conform to the specifications for petrolatum liquidum U. S. P. There are also numerous technical grades of white mineral oils.

All white mineral oils when refined to meet some such extreme color specification are susceptible to oxidation. The oxidation imparts first a rancid taste to the oil and if it is allowed to proceed further it will cause a deterioration of the color. I have discovered that the products removed by the fuller's earth during the filtration are good inhibitors to prevent oxidation of the white mineral oil.

The test used for comparing white mineral oil samples with and without an anti-oxidation catalyst was to heat the sample at 100° C. for sixteen hours and test it for rancidity by taste and also test it by the hot acid test.

The hot acid test is described on page 315 of the U. S. Pharmacopoeia (9th edition). This test has been used with a slight modification as follows: 10 c. c. of concentrated sulfuric acid and 10 c. c. of white mineral oil are heated in a steam bath at 100° C. periodically shaking by hand. The technique is standardized to give consistent results. The supernatant oil is drawn off and the sulfuric acid layer measured colorimetrically. Finished medicinal oil should give an acid layer not darker than pale amber.

A lowering of the hot acid test (darker colored acid) after storage or heating at 100° C. for 16 hours is an indication of instability.

Several methods may be used to introduce the anti-oxidants of the present invention into the white mineral oil.

First, spent clay is extracted with petroleum ether and the solvent distilled off. About 0.2% of this extract will make an unstable white oil stable to the hot acid test after 16 hours at 100° C. Such an amount of the extract will not lower the color beyond the specification. However, smaller amounts are also sufficient and in some cases more than 0.2% may be used. 0.02 to 1.0% are the approximate limits of the amount of extract used.

Secondly, a small percentage of the unfiltered oil, the so-called neutral oil, may be added to the filtered white mineral oil. The amount to be used is usually between 1% and 2%. The neutral oil naturally contains those anti-oxidation catalysts which are removed by the complete filtration. The white mineral oils to which a specified amount of neutral oil has been added do not become rancid and are stable to the hot acid test after 16 hours at 100° C.

Having thus described my invention and the method of carrying it out, what I claim is:

1. The process of stabilizing U. S. P. white mineral oils against deterioration due to oxidation, which comprises adding to the white mineral oil a small amount of oil obtained by extracting clay that has been previously used in the filtration step of the manufacture of U. S. P. white mineral oil.

2. Process according to claim 1 in which the amount of extract added is 0.02 to 1.0% of the amount of white oil.

3. The process of stabilizing U. S. P. white mineral oils against deterioration due to oxidation, which comprises adding to a filtered white mineral oil between 1 and 2% of the amount of the filtered white mineral oil of an oil that has been subjected to the heavy fuming sulfuric acid treatment required to produce white oil of U. S. P. grade and neutralized with an alkali and containing such components of the mineral oil as are removed during the filtration step in the manufacture of U. S. P. white mineral oils.

FRANCIS M. ARCHIBALD.